(12) United States Patent
Yamagami et al.

(10) Patent No.: US 6,273,161 B1
(45) Date of Patent: Aug. 14, 2001

(54) TIRE WITH SINGLE WIRE STEEL BELT CORD

(75) Inventors: Akio Yamagami, Ushiku; Makoto Nakayama, Kitakami; Ryouichi Shibata, Hanamaki, all of (JP)

(73) Assignee: Tokyo Rope Mfg. Co., Ltd., Tokyo (JP)

( * ) Notice: Subject to any disclaimer, the term of this patent is extended or adjusted under 35 U.S.C. 154(b) by 0 days.

(21) Appl. No.: 09/320,433

(22) Filed: May 26, 1999

(30) Foreign Application Priority Data

May 28, 1998 (JP) .................................................. 10-147663

(51) Int. Cl.[7] ................................. B60C 9/00; B60C 9/20
(52) U.S. Cl. ........................................... 152/527; 152/451
(58) Field of Search ............................. 57/206, 311, 902; 152/527, 451; 428/295.7, 369

(56) References Cited

U.S. PATENT DOCUMENTS 3,402,546 * 9/1968 Peene ................................. 57/902 X

FOREIGN PATENT DOCUMENTS

| 1034329 | * 6/1966 | (GB) | ..................................... 152/527 |
| 7-1915 | 1/1995 | (JP) . | |
| 10-25680 | 1/1998 | (JP) . | |

* cited by examiner

*Primary Examiner*—Adrienne C. Johnstone
(74) *Attorney, Agent, or Firm*—Christensen O'Connor Johnson & Kindness

(57) ABSTRACT

A single wire steel cord is prepared by flattening a round wire to have two flat surfaces facing each other and two round surfaces interposed between the two flat surfaces to face each other, wherein a flattening ratio D/W of the wire, where D denotes the short diameter of the cross section of the flattened wire and W denotes the long diameter of the cross section of the flattened wire, falls within a range of 0.5 to 0.95. Forming is applied to the flattened wire in a direction of at least the short diameter of the cross section of the flattened wire, and the flattened single wire steel cord is embedded in a tire belt portion such that one flat surface of the cord faces that portion of the tire which is brought into contact with the ground.

16 Claims, 12 Drawing Sheets

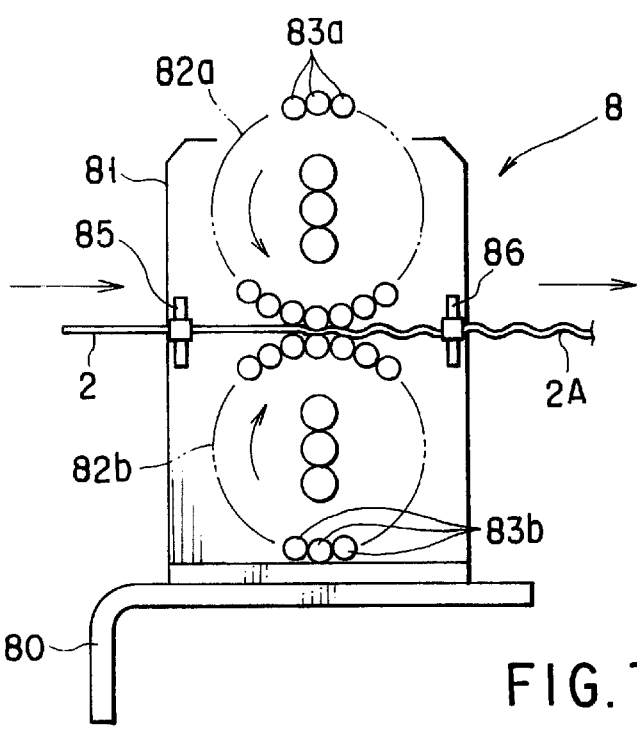
FIG. 7
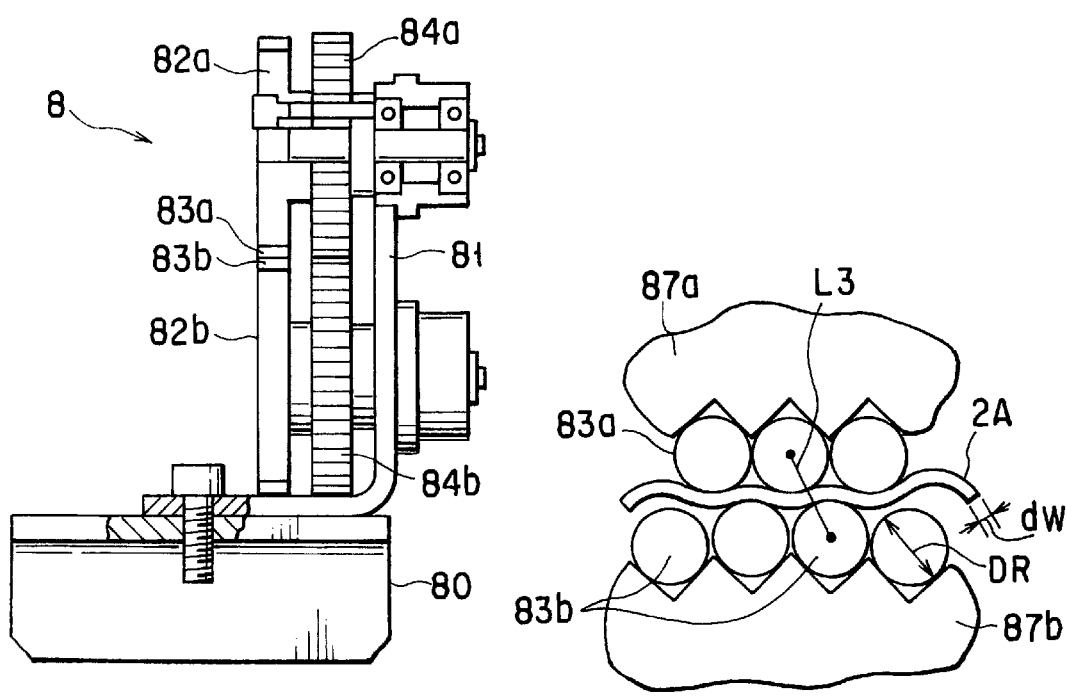
FIG. 8
FIG. 9

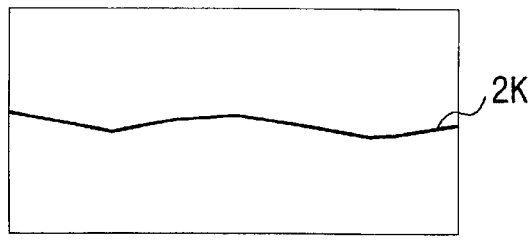
FIG. 10A  GEAR CRIMP 0.25HT
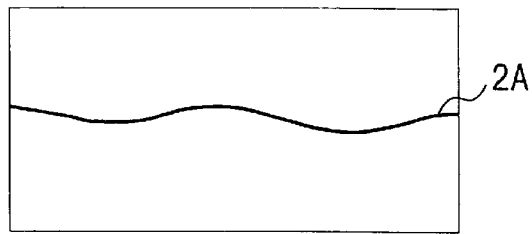
FIG. 10B  ARC-SHAPE FORMING 0.25HT
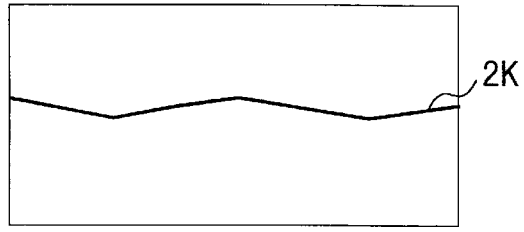
FIG. 10C  GEAR CRIMP 0.30HT
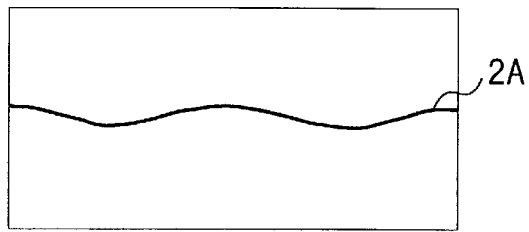
FIG. 10D  ARC-SHAPE FORMING 0.30HT
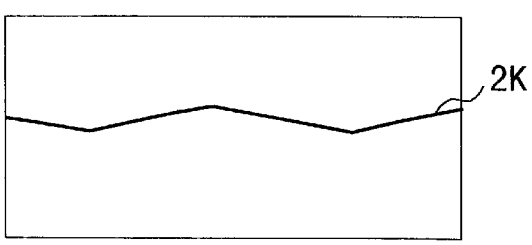
FIG. 10E  GEAR CRIMP 0.35HT
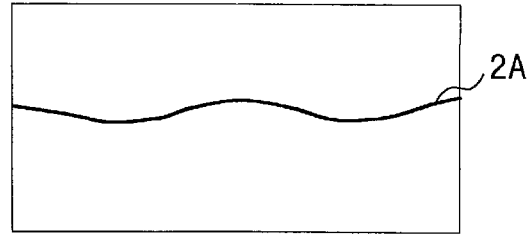
FIG. 10F  ARC-SHAPE FORMING 0.35HT

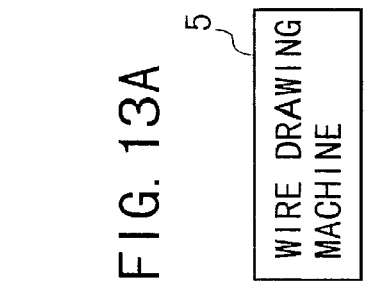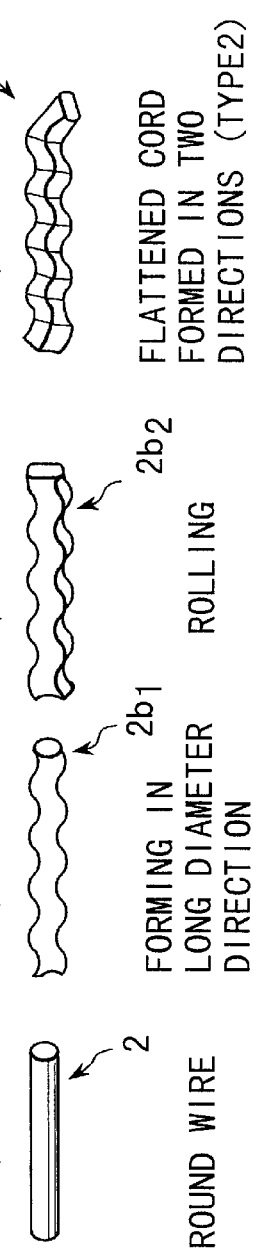
FIG. 13A
FIG. 13B
FIG. 13C

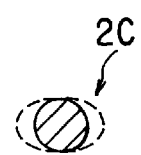
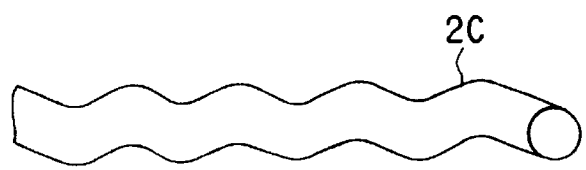
FIG. 15A
COMPARATIVE
FIG. 15B
COMPARATIVE
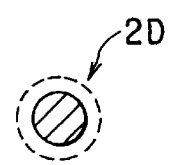
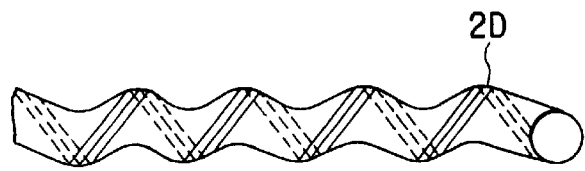
FIG. 16A
COMPARATIVE
FIG. 16B
COMPARATIVE
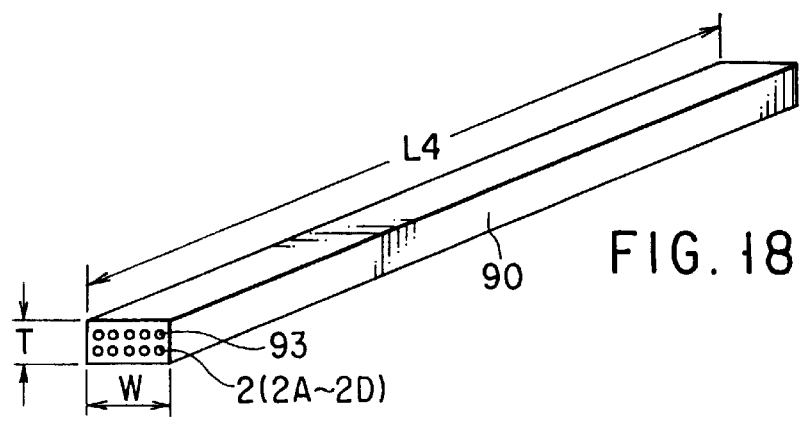
FIG. 18
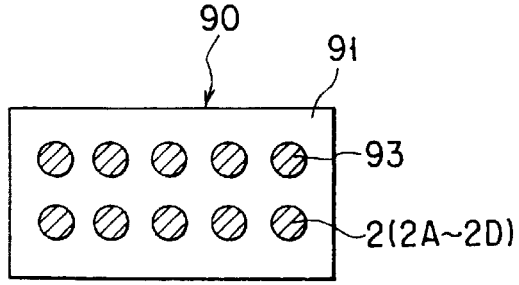
FIG. 19
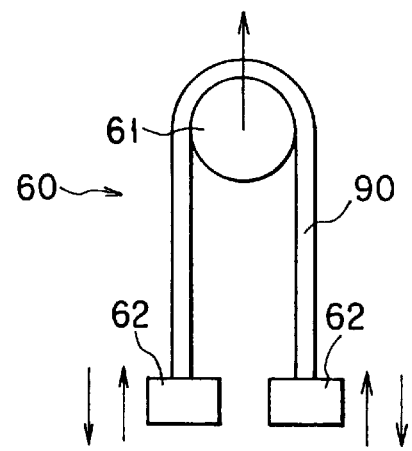
FIG. 20

TIRE WITH SINGLE WIRE STEEL BELT CORD

BACKGROUND OF THE INVENTION

The present invention relates to a single wire steel cord used for reinforcing various vehicle tires and a method of manufacturing the same, particularly, to a single wire steel cord buried in a tire belt portion of a tire and a method of manufacturing the same.

In recent years, the total amount of an exhaust gas is severely regulated as a measure for promoting the program for suppressing the temperature elevation of the earth. In this connection, the reduction in the fuel consumption of the vehicle is being vigorously studied, and an extensive research is being made on the reduction in the thickness of the rubber portion of the tire in an attempt to decrease the weight of the tire. Under the circumstances, the vehicle industries are ardently looking forward to the development of a steel cord as a reinforcing material of the tire. The development of a single wire steel cord, which is expected to make the tire thin to decrease the tire weight and to improve the tire performance while the vehicle is run, particularly, the cornering power and comfortableness of the riding, is of high importance in the future in view of the improvement of the environment of the earth.

The belt layer of a radial tire for a motorcar for riding is formed between the tread and the carcass and acts as a belt stretched in the circumferential direction so as to strongly fasten the carcass like a hoop and, thus, to improve the rigidity of the tread. The particular function of the belt layer is indispensable in order to enable the tire to support the weight of the vehicle and to exhibit its cornering power.

A steel cord of (1×n) stranded structure, which is prepared by stranding a plurality of wires, is generally used in the tire belt layer. The steel cord of the wire-stranded structure, which certainly exhibits a high rigidity, causes the tire to exhibit an unduly large repulsive force when the vehicle runs on an unpaved road having a rough road surface, leading to a poor riding comfortableness, and also causes the tread surface of the tire to tend to be cracked. Where the tread surface is cracked, the rain water or the like is likely to enter the tire through the cracks so as to promote corrosion of the cord wire. Further, if the tire is deformed or vibrated, the stranded wires are rubbed each other to cause a so-called "fretting wear", with the result that the cord wire is markedly deteriorated by fatigue.

In order to overcome the above-noted problems, it is proposed to use a single wire steel cord made of a round wire, i.e., a wire having a circular cross section, in the belt layer of the tire in place of the steel cord of the stranded structure, because the single wire steel cord is superior in flexibility to the steel cord of the stranded structure.

However, the conventional single wire steel cord made of a round wire and the steel cord of the (1×n) stranded structure give rise to serious problems as pointed out below.

The characteristics used for evaluating the performance of the steel cord include a "kill" (i.e., torsion) and an arc height. The kill is one of the cord characteristics used for evaluating the rotary torque inherent in the cord itself. On the other hand, the arc height is one of the cord characteristics used for evaluating linearity of the steel cord. If the kill is non-uniform or the arc height is unduly large, a calendered sheet is twisted or swollen in the calendering step included in the tire manufacturing process, in which steel cords are arranged on a thin rubber sheet, followed by covering the arranged steel cords with another thin rubber sheet such that the steel cords are sandwiched between the two rubber sheets.

In the conventional cord of (1×n) stranded structure or a single round wire cord, the kill and the arc height tend to be varied by the material factor of the cord and by the mechanical factor such as the wire drawing machine or a stranding machine. Particularly, the round wire cord gives rise to a large variation in the kill, making it necessary to apply inspection to each steel cord product even in the general quality guarantee level.

(I) Kill (i.e., Torsion):

The evaluation of the rotary torque (kill) inherent in the steel cord itself is particularly important as a performance of the steel cord used in the tire. The kill will now be described with reference to FIG. 1.

For measuring the kill, a cord 2 is withdrawn from a product cord spool 1 in a length L (=6m), and a cord terminal portion 2c is folded in an L-shape and fixed by a fixing tool (not shown). Then, the cord terminal portion 2c is released from the fixing tool. As a result, the cord terminal portion 2c is rotated about the axis of the cord depending on the degree of twisting of the cord 2. The number of rotations is counted to determine the kill. In the case of the ordinary S-stranding, the rotation in the direction equal to the stranding direction, i.e., clockwise direction, is called a positive kill (+), and the rotation in the opposite direction, i.e., counterclockwise direction, is called a negative kill (−). In general, the kill is satisfactory if the number of rotations is within a range of ±2 rotations, and the cord having a kill of this level gives rise to no practical problem.

(II) Arc Height:

The evaluation of the linearity of the steel cord under a non-constrained state (arc height) is important as a performance of a steel cord used in a tire belt portion. The arc height, which is denoted by "AH" in FIG. 2B, is the height of the arc made by a cord 2 cut to have a length L2 (=400 mm) as shown in FIG. 2A, with the both ends of the cord 2 kept in contact with a flat plate 3. In general, the steel cord having an arc height AH of 30 mm or less is satisfactory and gives rise to no practical problem.

(III) Cornering Power and Comfortableness of Riding:

A good operability of the steering wheel during the high speed running of the vehicle, i.e., a large cornering power for avoiding danger, is one of the performances required for a steel radial tire. A steel cord having a high rigidity is used in the conventional steel radial tire. However, when the vehicle runs on an unpaved rough road, the vertical vibration received by the tire is directly transmitted to the driver, leading to a poor comfortableness of riding. The performances required for the reinforcing steel cord for the tire belt layer are the durability in the lateral direction in the cornering step and the comfortableness of riding during running of the vehicle.

It is important for the steel cord in the future to achieve these two performances.

(IV) Thinning of Tire Rubber Layer:

In recent years, vehicles tend to be designed to suppress the fuel consumption as a measure against the temperature elevation of the earth. In this connection, it is important to reduce the weight of the tire. However, it is difficult to decrease sufficiently the thickness of the tire rubber layer in the conventional tire using a stranded steel cord or a single wire cord made of a round steel wire.

BRIEF SUMMARY OF THE INVENTION

An object of the present invention is to provide a single wire steel cord for a tire, the steel cord enabling the tire to exhibit a large cornering power, enabling the vehicle using the particular tire to be excellent in comfortableness of riding, and being capable of decreasing the thickness of the tire rubber layer and a method of manufacturing the same.

In order to improve the durability in the lateral direction in the cornering step, it is important to use a cord having a high lateral rigidity E1. For improving the comfortableness of riding, the tire is required to absorb flexibly the surface roughness of the road and to suppress the poor comfortableness of riding felt by the driver. To meet these requirements, it is effective to use a cord having a reasonable vertical rigidity E2.

In order to allow the steel cord in the belt portion to have a high durability and a high flexibility, it is important for the steel cord to have an anisotropy in rigidity such that the lateral rigidity E1 is greater than the vertical rigidity E2 (E1>E2). In the conventional steel cord of the stranded structure or the single wire steel cord made of a round wire, the lateral rigidity E1 and the vertical rigidity E2 are substantially equal to each other even if a two dimensional forming or a three dimensional (spiral) forming is applied to the steel cord. As a result, it is impossible to satisfy simultaneously both the durability in the lateral direction in the cornering step and the comfortableness of riding in the vertical direction. To be more specific, if an emphasis is placed on the durability, the riding comfortableness is impaired. On the other hand, if an emphasis is placed on the riding comfortableness, a satisfactory durability in the lateral direction cannot be obtained.

It is proposed in Japanese Patent Disclosure (Kokai) No. 7-1915 to use a single wire steel cord in the belt layer of a tire in place of the single wire steel cord made of a round wire. The single wire steel cord, which is obtained by flattening the wire, followed by applying a two dimensional forming to the flattened wire by using an apparatus disclosed in, for example, Japanese Patent Disclosure (Kokai) No. 10-25680, is excellent in adhesive properties to rubber and exhibits a high bending-resistant rigidity. Therefore, if the particular single wire steel cord is used in the belt portion of a tire for a vehicle for riding, an excellent steering stability can be obtained. However, the single wire steel cord disclosed in JP 7-1915 noted above is incapable of sufficiently decreasing the thickness of the tire rubber layer and of sufficiently improving the comfortableness of riding.

Under the circumstances, the present inventors have conducted an extensive research in an attempt to decrease sufficiently the thickness of the tire and to improve the comfortableness of riding of the vehicle, arriving at the present invention.

According to an aspect of the present invention, there is provided a single wire steel cord prepared by flattening a round wire to have two flat surfaces facing each other and two round surfaces interposed between the two flat surfaces to face each other, wherein a flattening ratio D/W of the wire, where D denotes the short diameter of the cross section of the flattened wire and W denotes the long diameter of the cross section of the flattened wire, falls within a range of 0.5 to 0.95, forming is applied in a direction of at least the short diameter, and the flattened single wire steel cord is embedded in a tire belt portion such that one flat surface of the cord faces that portion of the tire which is brought into contact with the ground.

According to another aspect of the present invention, there is provided a method of manufacturing a flattened single wire steel cord embedded in a tire belt portion such that one flattened surface of the cord faces that portion of the tire which is brought into contact with the ground, comprising the steps of:

(a) flattening a round wire to have a flattening ratio D/W, where D denotes the short diameter of the cross section of the flattened wire and W denotes the long diameter of the cross section of the flattened wire, falling within a range of 0.5 to 0.95; and (b) applying forming to the wire flattened in step (a) in a direction of the short diameter of the flattened wire.

It is desirable to apply before step (a) a forming treatment to the round wire in a direction perpendicular to the forming direction in step (b). In this case, it is desirable to set the flattening ratio in step (a) to fall within a range of 0.80 to 0.95.

When it comes to a single wire steel cord in which a crimp forming is applied to the short diameter direction alone, it is desirable to set the flattening ratio to fall within a range of 0.50 to 0.95.

If the flattening ratio D1/W1 exceeds the upper limit of 0.95 specified in the present invention to allow the wire to have a cross section close to a circular cross section, it is impossible to obtain a sufficient effect of decreasing the kill (rotary torque) produced by the rolling. In addition, the rigidity in the direction of the long diameter is rendered close to that in the direction of the short diameter.

On the other hand, the flattening ratio D1/W1 should not be smaller than 0.50 in the present invention. It should be noted that a wire prepared by drawing a high carbon steel wire for a steel cord containing 0.82% of carbon exhibits a high tensile strength, i.e., about 300 $kgf/mm^2$. If the wire is rolled to achieve a flattening ratio smaller than 0.50, the rolled wire tends to be cracked.

It is desirable for the forming height F1 in the direction of the short diameter to be not larger than 0.3 mm. If the forming height is larger than 0.3 mm, the rubber portion is rendered unduly thick, resulting in failure to achieve the object of decreasing the tire weight.

On the other hand, the forming height in the direction of the short diameter should not be smaller than 0.05 mm. In order to decrease the arc height AH to 30 mm or less, which is a satisfactory level, the forming height of at least 0.05 mm is required.

The forming pitch P1 should desirably be 2 to 20 mm, which is a range of the practical forming pitch.

The term "forming" denotes a two or three dimensional plastic deformation achieved by applying in advance stress exceeding an elastic limit to the wire.

The term "crimp forming" denotes that the wire is plastically deformed such that the same waving is repeated within a single plane. The particular wave shape consists of straight portions and bent portions which are alternately repeated. A typical crimp forming is a gear crimp forming in which a wire is passed through a clearance between a pair of gears for imparting a plastic deformation to the wire. The crimp forming includes a processing in which a three dimensional spiral wire is crushed sideways to provide a wire having a two dimensional shape.

The term "arc-shape forming" denotes that a wire is formed to have a shape consisting of combination of smoothly continuous curves that do not include straight portions within a single plane. A typical arc-shape forming is a pin roller forming in which a wire is passed through a pair of pin rollers for imparting a plastic deformation to the wire. The shapes of the arc-shape forming include, for example, continuous arcs, sine waves, continuous arcs of cycloid (spiral curve), continuous arcs of cardioid (heart-shaped curve), and continuous arcs of tractrix (suspended line-shaped curve).

The cord in which forming is applied in the direction of the short diameter alone (cord of type 1) is relatively small in its set range of elongation. Where an elongation that cannot be covered by type 1 is required, used is a cord having a large range of elongation, in which forming is applied in both directions (cord of type 2).

The flattening ratio D2/W2 of the cord of type 2 should desirably be set to fall within a range of 0.80 to 0.95. If the flattening ratio exceeds 0.95, it is impossible to obtain an effect of decreasing the kill (rotary torque). Also, it is impossible to obtain an anisotropy of rigidity. In other words, no difference is provided between the rigidity in the direction of the long diameter and the rigidity in the direction of the short diameter. On the other hand, the lower limit of the flattening ratio, which is set at 0.80 in the present invention, is specified in order to prevent the wire from being worked excessively because the cord of type 2 is subjected to a forming treatment three times, i.e., the forming in the direction of the long diameter, the forming in the direction of the short diameter, and the flattening treatment. If the flattening ratio is lower than 0.80, the wire receives a large damage, leading to an excessively large reduction of mechanical strength.

It is desirable for the cord of type 2 to have a forming height F3 of 0.3 mm or less in the direction of the short diameter and a forming height F2 of 0.05 to 0.5 mm in the direction of the long diameter. If the forming height F3 exceeds the upper limit of 0.3 mm, the rubber layer of the tire is rendered excessively thick, resulting in failure to achieve the object of decreasing the tire weight. Also, if the forming height F2 exceeds the upper limit of 0.5 mm, the cord is excessively elongated, with the result that it is possible for the ridges and valleys of the adjacent cords to face each other depending on the arrangement of the cords. It follows that the non-uniformity in the clearance between adjacent cords is rendered prominent. On the other hand, if the forming height F2 is smaller than the lower limit of 0.05 mm, it is impossible to lower the arc height to 30 mm or less, which is a satisfactory level.

It is desirable for the forming pitches P2 and P3 to fall within a range of 2 to 20 mm in the directions of both the long diameter and the short diameter, because the forming pitches P2, P3 of 2 to 20 mm are the practical forming pitches. It should be noted, however, that, in order to eliminate the non-uniformity between the pitch in the direction of the long diameter and the pitch in the direction of the short diameter, it is desirable to set the pitch P2 in the direction of the long diameter at a value an integer number of times as large as the pitch P3 in the direction of the short diameter.

It is desirable to use a high tensile steel wire having a tensile strength of 280 to 400 kgf/mm$^2$ for preparing the single wire steel cord of the present invention. In order to obtain a single wire steel cord having a desired breaking strength, it is necessary to use a raw material wire having a tensile strength of at least 280 kgf/mm$^2$. On the other hand, if the tensile strength of the raw material wire exceeds 400 kgf/mm$^2$, the wire is rendered brittle and, thus, tends to give rise to wire breakage. More preferably, the tensile strength of the raw material wire should fall within a range of 300 to 380 kgf/mm$^2$.

It is also desirable to use a high tensile steel wire having a carbon content of 0.70 to 1.00% by weight for preparing the single wire steel cord of the present invention. The carbon content of the raw material wire should be at least 0.70% by weight in order to obtain a single wire steel cord having a desired breaking strength. However, if the carbon content exceeds 1.0% by weight, the wire is rendered brittle and, thus, tends to be broken. More preferably, the carbon content of the raw material wire should fall within a range of 0.75 to 0.95% by weight.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

FIG. 7 is a front view schematically showing an arc-shape forming apparatus;

FIG. 8 is a side view schematically showing an arc-shape forming apparatus;

FIG. 9 is a partially magnified view showing a gist portion of an arc-shape forming apparatus;

FIG. 10A schematically shows a gear crimp pre-formed single wire steel cord (0.25 HT);

FIG. 10B schematically shows an arc-shape formed single wire steel cord (0.25 HT);

FIG. 10C schematically shows a gear crimp formed single wire steel cord (0.30 HT);

FIG. 10D schematically shows an arc-shape formed single wire steel cord (0.30 HT);

FIG. 10E schematically shows a gear crimp formed single wire steel cord (0.35 HT);

FIG. 10F schematically shows an arc-shape formed single wire steel cord (0.35 HT);

FIG. 13A schematically shows the manufacturing line of single wire steel cord according to the second embodiment of the present invention;

FIG. 13B schematically shows the appearance of the single wire steel cord in each step of the manufacturing line shown in FIG. 13A;

FIG. 13C is a lateral cross sectional view showing the single wire steel cord in each step of the manufacturing line shown in FIG. 13A;

FIG. 15A is a lateral cross sectional view showing a single wire steel cord according to Comparative Example 1;

FIG. 15B schematically shows the single wire steel cord of Comparative Example 1;

FIG. 16A is a lateral cross sectional view showing a single wire steel cord according to Comparative Example 2;

FIG. 16B schematically shows the single wire steel cord of Comparative Example 2;

FIG. 18 is an oblique view showing a test piece used for a belt durability test;

FIG. 19 is a lateral cross sectional view showing the test piece used for the belt durability test; and FIG. 20 schematically shows a belt durability tester.

DETAILED DESCRIPTION OF THE INVENTION

Various preferred embodiments of the present invention will now be described with reference to the accompanying drawings.

Figure 1:
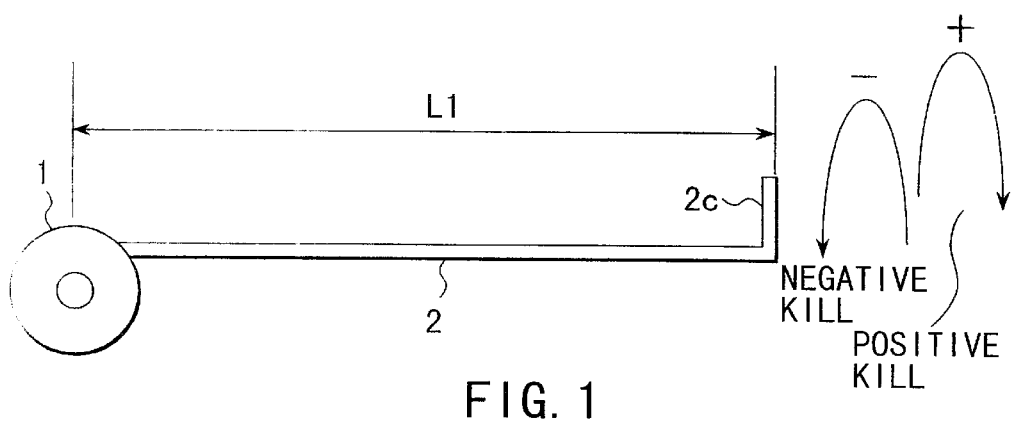
FIG. 1 schematically illustrates a kill (torsion) of a single wire steel cord.
Figure 2A:
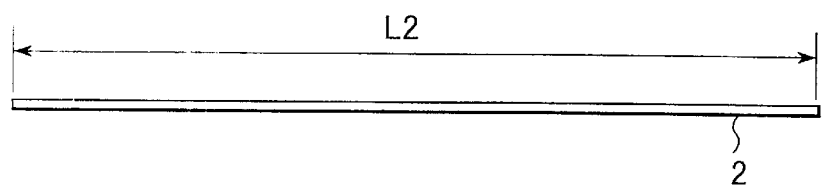
FIG. 2A shows a steel cord cut to have a predetermined length.
Figure 2B:
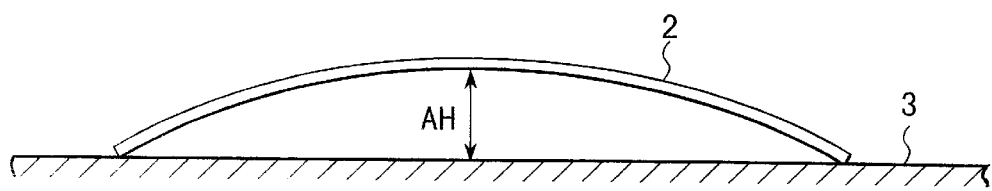
FIG. 2B shows the method of measuring the arc height of a steel cord.
Figure 3:
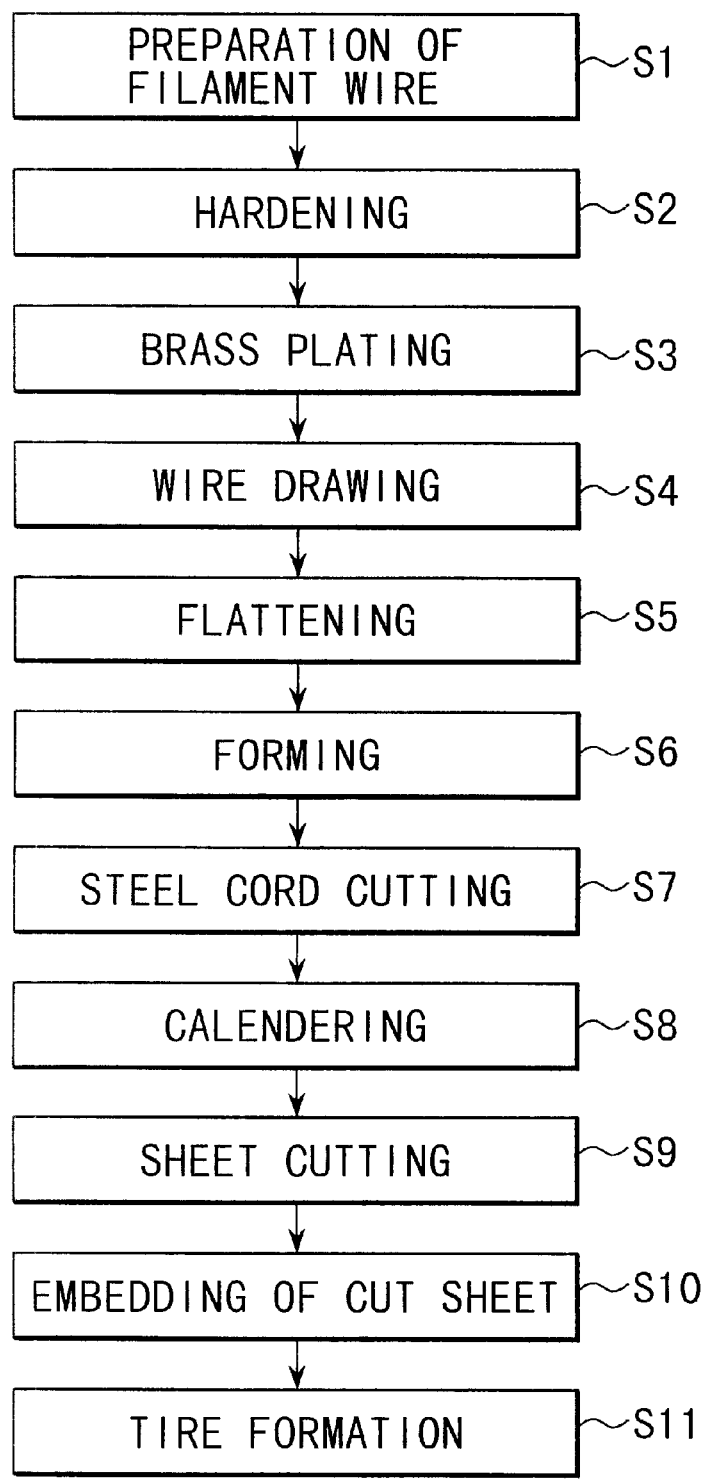
FIG. 3 shows the steps for manufacturing a single wire steel cord according to a first embodiment of the present invention.
Figure 4:
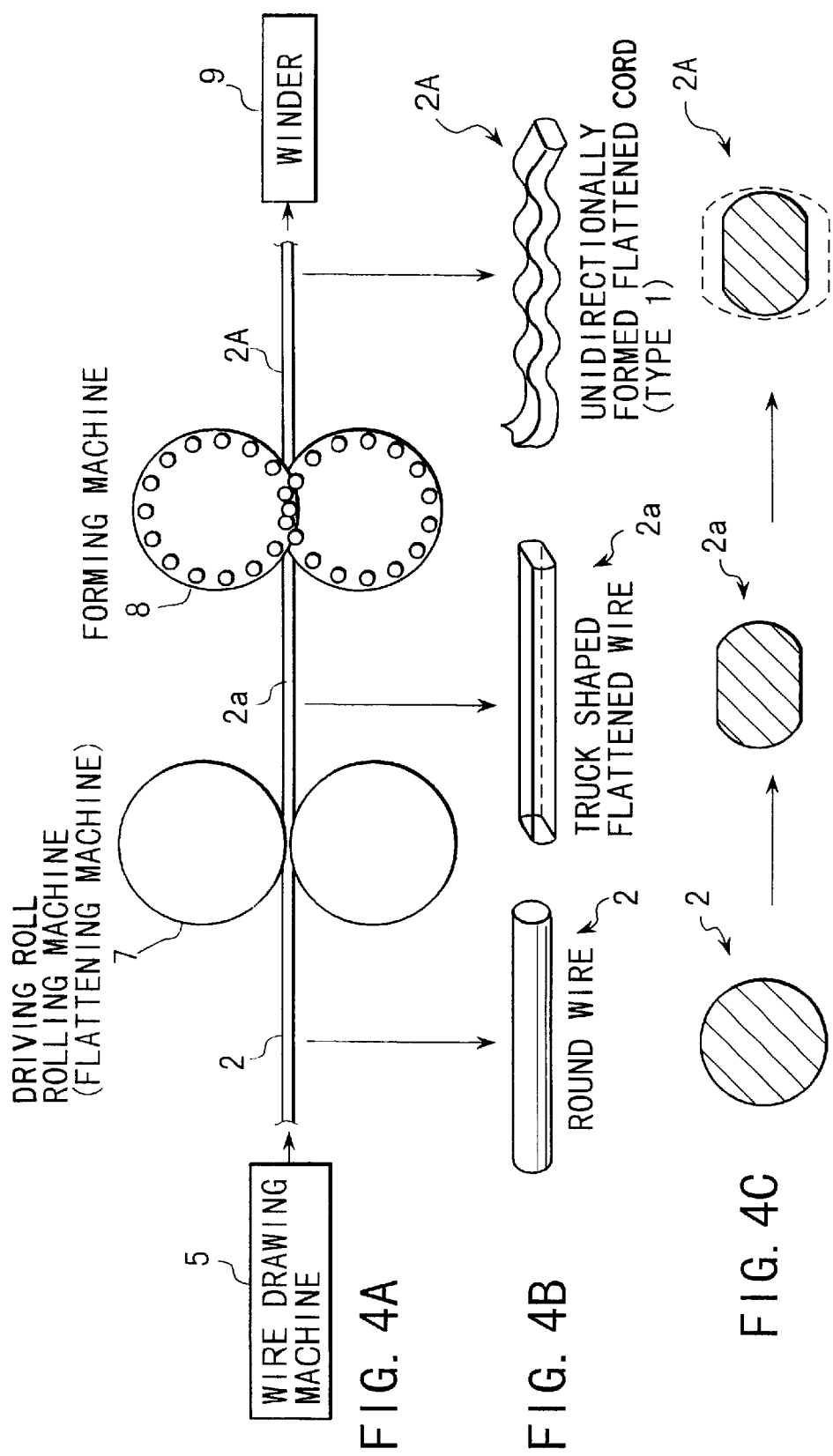
FIG. 4A schematically shows a manufacturing line of a single wire steel cord according to one embodiment of the present invention.
FIG. 4B schematically shows the appearance of the single wire steel cord in each step of the manufacturing line shown in FIG. 4A.
FIG. 4C is a lateral cross sectional view showing the single wire steel cord in each step of the manufacturing line shown in FIG. 4A.

Specifically, a single wire steel cord 2A of type 1 shown in FIGS. 4B, 4C, 11A and 11B was prepared by the method shown in FIGS. 3 and 4A. Then, a steel radial tire 10 shown in FIG. 11C was prepared by using the single wire steel cord 2A thus prepared. Also, a single wire steel cord 2B of type 2 shown in FIGS. 13B, 13C, 14A and 14B was prepared by the method shown in FIGS. 12 and 13A. Further, a steel radial tire 20 shown in FIG. 14C was prepared by using the single wire steel cord 2B thus prepared.

Each of these single wire steel cords and the manufacturing methods thereof will now be described in detail.

Examples 1 and 2

Cord of Type 1):

A steel wire containing 0.82±0.02% by weight of carbon was prepared as a filament wire (step S1). The filament wire was kept at 950° C. for 30 seconds within a heating furnace, followed by a hardening treatment (step S2) in which the filament wire was kept at 550° C. for 8 seconds within a furnace of a fluidized bed using sand. Then, the surface of the monofilament wire was plated with brass consisting of 63% by weight of copper and 37% by weight of zinc in an electroplating bath (step S3). The plated monofilament wire was drawn by a drawing machine 5 to prepare a high tensile steel wire 2 having a tensile strength of 308 to 312 kgf/mm$^2$ (step S4). The diameter of the drawn wire, which was a round wire having a circular cross section, was found to be 0.40 mm. Also, the brass plating amount was found to be 4 g/kg of the wire.

In the next step, the resultant round wire 2 was forwarded into a driving roll rolling apparatus 7 in which the round wire 2 was deformed by a pair of upper and lower rolls 71, 72 to obtain a flattened wire 2a having a cross section sized at 0.30 mm (short diameter)×0.46 mm (long diameter) (step S5).

Figure 5:
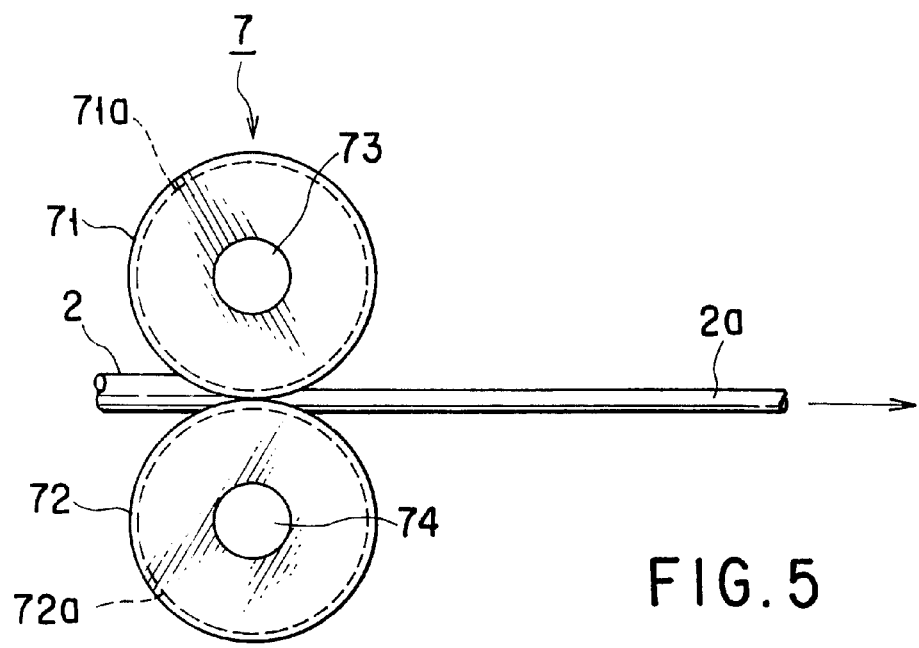
FIG. 5 is a front view showing a gist portion of a flattening apparatus (driving roll rolling apparatus)
Figure 6:
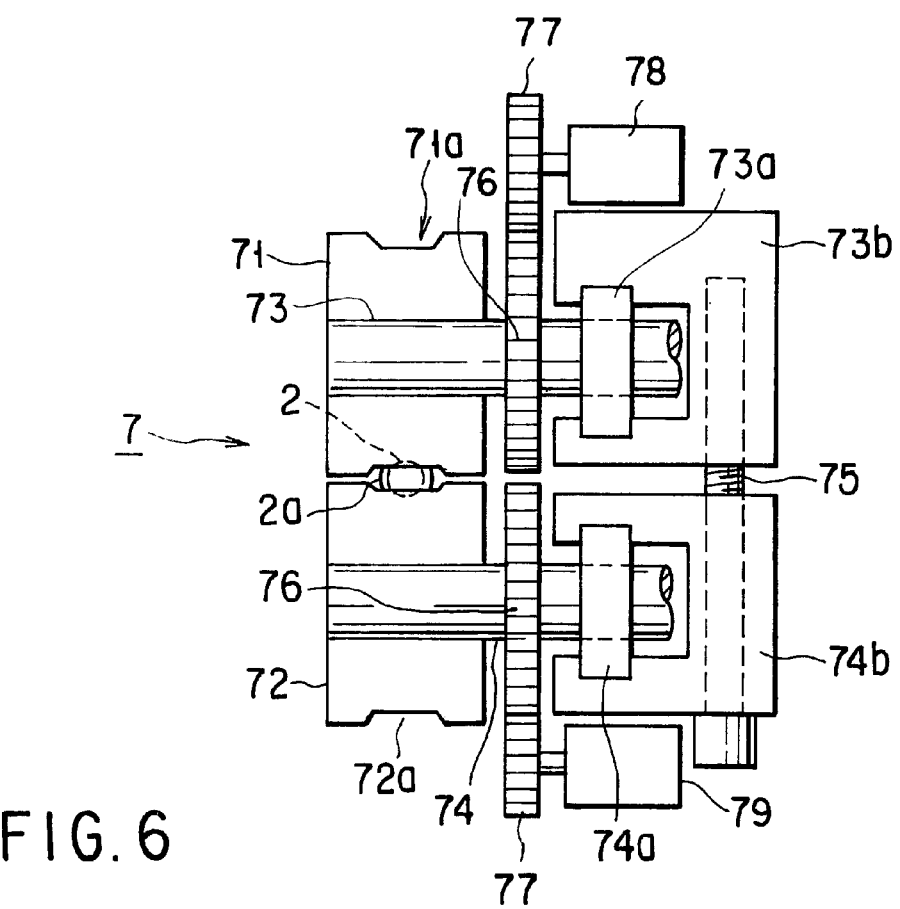
FIG. 6 is a side view showing a gist portion of a flattening apparatus (driving roll rolling apparatus)

The driving roll rolling apparatus (flattening machine) 7 will now be described with reference to FIGS. 5 and 6. The flattening machine 7 comprises a pair of upper and lower caliber rolls 71, 72. The upper roll 71 is joined to a driving shaft 73 rotated by a motor 78, with the lower roll 72 being joined to a driving shaft 74 rotated by a motor 79. Large gears 76 are mounted to the driving shafts 73, 74, respectively, and are in mesh with small gears 77 mounted to each of the driving shafts of the motors 78, 79. Calibers 71a and 72a, which are recesses of a predetermined shaped, are formed on the circumferential surfaces of the rolls 71 and 72. The roll shafts 73 and 74 are joined to and supported by brackets 73b, 74b via bearings 73a, 74b, respectively. The lower bracket 74b is fixed to a frame (not shown) of the rolling apparatus, and the upper bracket 73b is joined to the lower bracket 74b by an adjusting screw 75. If the adjusting screw 75 is rotated, the upper bracket 73b and the upper roll 71 are moved upward so as to change the gap between the upper roll 71 and the lower roll 72. Incidentally, a hydraulic cylinder mechanism can be used in place of the adjusting screw 75 as the roll gap adjusting mechanism.

The round wire 2 was held between the calibers 71a and 72a of the upper and lower rolls 71, 72 so as to be pressed in both the upper and lower directions and, thus, to form a flattened wire 2a. Then, the flattened wire 2 was forwarded into an arc-shape forming machine 8, in which the flattened wire 2 was formed in the direction of the short diameter by pin rolls 83a, 83b (step S6). As a result, obtained was a flattened cord 2A that was formed in one direction.

The arc-shape forming machine 8 will now be described with reference to FIGS. 7 and 8. Specifically, a pair of upper and lower large rollers 82a and 82b are housed in a housing 81 of the forming machine 8. The housing 81 is provided with an inlet guide 85 and an outlet guide 86. The wire 2 is guided into the housing 81 through the inlet guide 85, passes through the clearance between the larger rollers 82a and 82b and, then, is taken out of the housing 81 through the outlet guide 86.

As shown in FIG. 9, holders 87a, 87b are formed at a uniform pitch on the outer circumferential surfaces of the large rollers 82a, 82b, respectively. The pin rolls 83a, 83b having a small diameter are arranged in these holders 87a, 87b, respectively. These pin rolls 83a are arranged very close to each other such that the clearance between adjacent pin rolls 83a is substantially eliminated. Likewise, the pin rolls 83b are arranged very close to each other such that the clearance between adjacent pin rolls 83b is substantially eliminated. The upper roller 82a is joined coaxial to a gear 84a and the lower roller 82b is joined coaxial to a gear 84b. Also, the upper gear 84a and the lower gear 84b are in mesh with each other. These gears 84a and 84b prevent slippage occurrence between the upper and lower rollers 82a, 82b so as to rotate these rollers 82a, 82b in synchronism without fail.

The wire 2 held between the large rollers 82a and 82b are bent by the pin rolls 83a, 83b. As a result, a smooth and continuous arc-shape forming is imparted to the wire 2, as shown in FIGS. 10B, 10D, and 10F. In this case, the diameter D of the pin rolls 83a, 83b should be sufficiently larger than the wire diameter d. For example, the diameter D of the pin rolls 83a, 83b should desirably be 5 to 50 times as large as the wire diameter d.

It is possible to use a gear crimp forming machine disclosed in, for example, Japanese Patent Disclosure (Kokai) No. 10-25680 in place of the arc-shape forming machine 8 described above so as to impart a two dimensional gear crimp forming to the wire 2. FIGS. 10A, 10C and 10E show the outer appearances of a wire 2K having a gear crimp forming imparted thereto by the gear crimp forming machine.

Figure 11A:
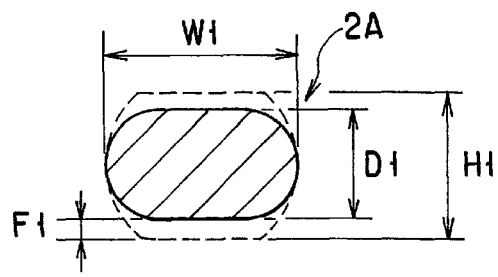
FIG. 11A is a cross sectional view showing a single wire steel cord according to a first embodiment of the present invention (cord of type 1)
Figure 11B:
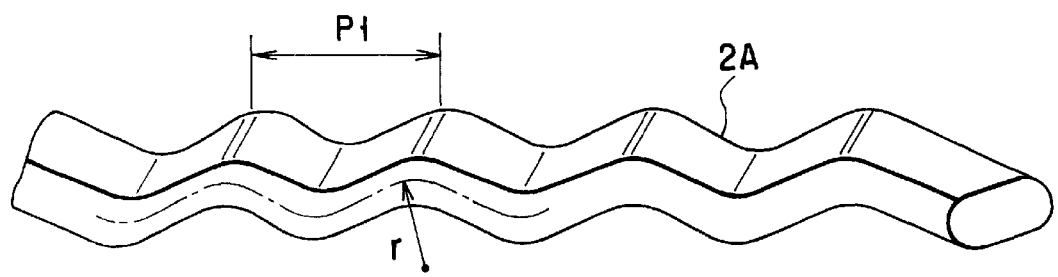
FIG. 11B schematically shows the appearance of the single wire steel cord according to the first embodiment of the present invention (cord of type 1)
Figure 11C:
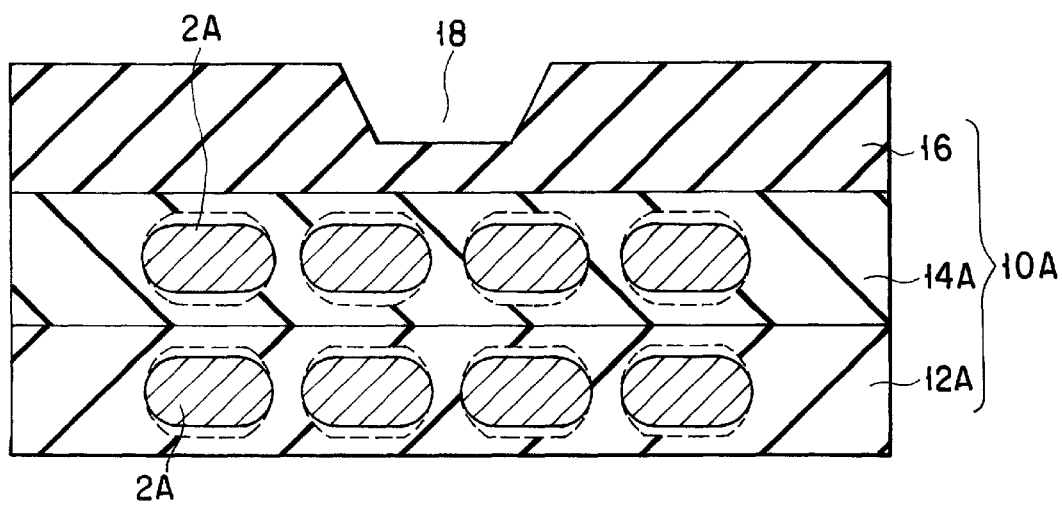
FIG. 11C is a lateral cross sectional view schematically showing a steel radial tire having the single wire steel cord according to the first embodiment of the present invention (cord of type 1) embedded therein.
Figure 12:
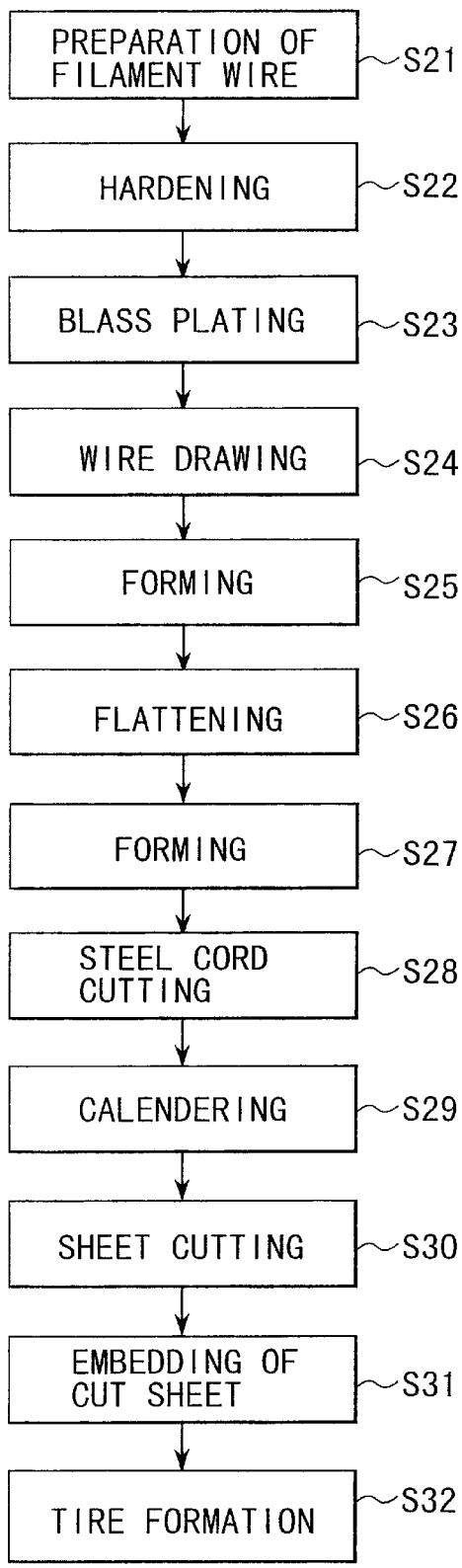
FIG. 12 shows the steps of manufacturing a single wire steel cord according to a second embodiment of the present invention.

As shown in Table 1 and FIGS. 11A, 11B, the cords 2A of type 1 in Examples 1 and 2 have a forming height F1 of 0.1 mm, 0.1 mm in the direction of the short diameter, the short diameter D1 of 0.30 mm, 0.36 mm, the long diameter W1 of 0.46 mm, 0.44 mm, a flattening ratio D1/W1 of 0.65, 0.68, and a forming pitch P1 of 6 mm, 6 mm.

Further, the cord 2A was wound up by a reel of a winder 9, and the reel was mounted to a feeding side of a cutting line to have the cord 2A cut in a predetermined length by a cutter (not shown) (step S7). The cut cord 2A was 200 m long. As shown in Table 1, the cord 2A was found to exhibit a kill of 0 to 0.75 rotation (or 0.5 rotation on the average) and an arc height of 10 to 28 mm (or 15 mm and 24 mm on the average).

The cords 2A of type 1 in Examples 1 and 2 were found to exhibit a rigidity index G2 in the direction of the short diameter of 74 and 97, a rigidity index G1 in the direction of the long diameter of 149 and 114, and a rigidity ratio G1/G2 of 2.00 ad 1.18. The rigidity index represents a ratio in the case where the rigidity G3 of a round wire is used as a reference value of 100. The rigidity index was measured in two directions shown in FIG. 17. The cord 2A of type 1 was found to exhibit a small value of elongation at break, i.e., 2.5 to 3.5%.

Then, the cut cords 2A were subjected to a so-called calendering step in which the cut cords 2A were arranged in parallel at a predetermined pitch on a crude rubber sheet (step S8). In the calendering step S8, the cords 2A were arranged such that one flat surface of the cord 2A was parallel to the surface of the crude rubber sheet. Since the cut cords 2A had a small arc height, it was possible to arrange easily the cut cords 2A. The cut cords 2A were arranged at a pitch of, for example, 1.2 mm.

Then, the rubber sheet was cut in a predetermined size (step S9). Two cut sheets 12A and 14A were superposed one upon the other on a belt portion of the tire-shaped rubber article to allow the buried cords 2A to cross each other at a predetermined angle. Further, a rubber member 16 having a tread 18 was attached to the rubber sheet 14A on the outside (second layer), thereby burying the cords 2A completely within the rubber (step S10). The article thus assembled was heated to a predetermined temperature to make the article integral and, thus, to obtain a tire product 10A shown in FIG. 11C (step S11).

In the tire product 10A, the cords 2A are arranged within the belt layers 12A and 14A such that the short diameter sides of the adjacent cords 2A face each other at a predetermined distance and are arranged obliquely in respect of the rotating direction of the tire. The particular construction permits increasing the lateral rigidity E1 to increase the durability and also permits lowering the vertical rigidity E2 so as to increase the comfortableness of riding.

A single wire steel cord of type 2 and a manufacturing method thereof will now be described with reference to FIGS. 12, 13A, 13B and 13C.

Examples 3 and 4

Cord of type 2

Prepared was a steel wire filament containing 0.82±0.02% by weight of copper (step S21). The filament was kept at 950° C. for 30 seconds within a heating furnace, followed by applying a hardening treatment to the filament at 550° C. for 8 seconds within a furnace of a fluidized bed using sand (step S22). Then, the surface of the filament was plated with brass consisting of 63% by weight of copper and 37% by weight of zinc within an electroplating bath (step S23). The steel wire plated with brass was drawn by the drawing machine 5 to obtain a high tensile steel wire 2 having a tensile strength of 308 to 312 kgf/mm$^2$ (step S24).

The drawn wire 2 was found to have a diameter of 0.40 mm. Also, the brass plating amount was found to be 4 g/kg of the wire.

The drawn wire 2 was forwarded into the forming machine 8 in which the wire 2 was formed in the direction of the long diameter by the pin rolls 83a, 83b to obtain a wire 2b1 formed in one direction (step S25).

In the next step, the wire 2b1 was forwarded into the flattening machine 7, in which the wire 2b1 was pressed both upward and downward by a pair of pressure rolls 71 and 72 to obtain a flattened wire 2b2 having a cross section sized at 0.36 mm (short diameter)×0.44 mm (long diameter). The flattening machine 7 shown in FIGS. 5 and 6 was used in this flattening step. The flattened wire 2b2 was forwarded into the forming machine 8, in which the wire 2b2 was formed in the direction of the short diameter by the pair of pin rolls 83a, 83b, to obtain a flattened cord 2B formed in two directions (step S27). Incidentally, it is possible to use the gear crimp forming machine disclosed in Japanese Patent Disclosure (Kokai) No. 10-25680 in place of the arc-shape forming machine 8 in each of the forming steps S25 and S27.

Figure 14A:
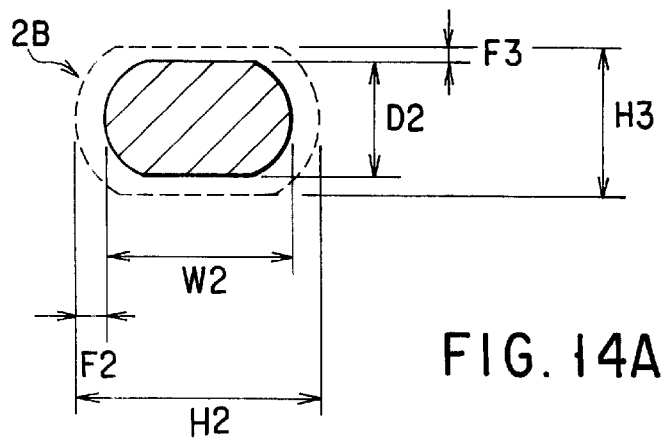
FIG. 14A is a lateral cross sectional view showing a single wire steel cord according to a second embodiment of the present invention (cord of type 2)
Figure 14B:
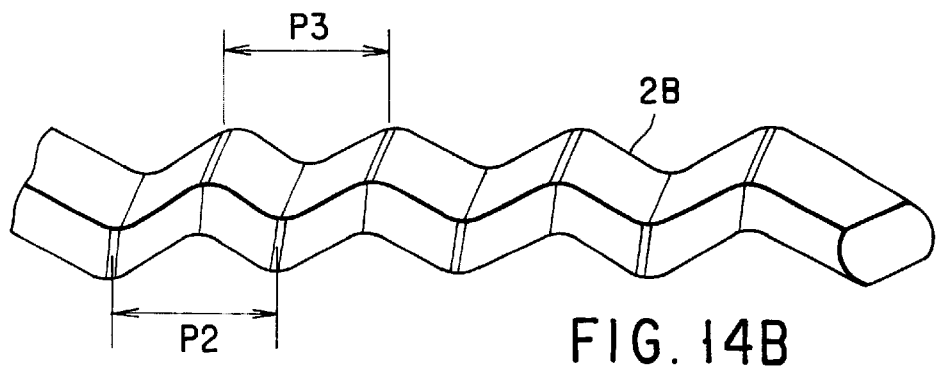
FIG. 14B schematically shows the appearance of the single wire steel cord according to the second embodiment of the present invention (cord of type 2)
Figure 14C:
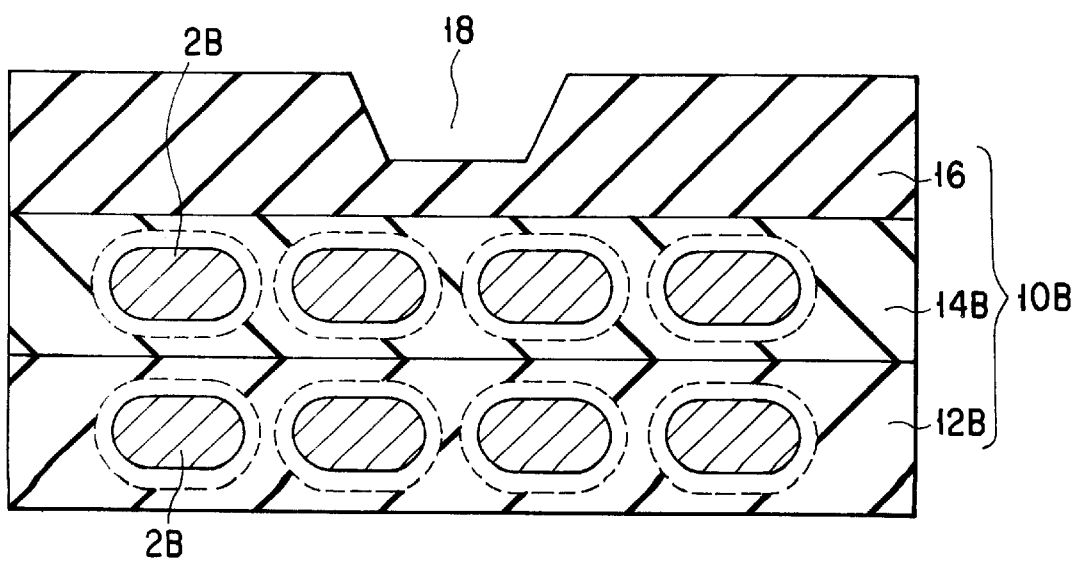
FIG. 14C is a lateral cross sectional view schematically showing a steel radial tire having the single wire steel cord according to the second embodiment of the present invention (cord of type 2) embedded therein.

As shown in Table 1 and FIGS. 14A, 14B, cords 2B of type 2 in Examples 3 and 4 exhibited a forming height F2 of 0.1 mm, 0.1 mm, in the direction of the long diameter, a forming height F3 of 0.1 mm, 0.1 mm in the direction of the short diameter, a short diameter D2 of 0.36 mm, 0.38 mm, a long diameter W2 of 0.44 mm, 0.43 mm, a flattening ratio D2/W2 of 0.82, 0.88, a forming pitch P2 of 6.0 mm, 6.0 mm, in the direction of the long diameter, and a forming pitch P3 of 3.0 mm, 3.0 mm, in the direction of the short diameter.

The cord 2B was taken up by a reel of the winder 9. Then, the reel was mounted to a feeding side of a cutting line to have the cord 2B cut by a cutter (not shown) in a predetermined length (step S28). The cut cord 2B was 200 m long. As shown in Table 1, the cord 2B was found to exhibit a kill of 0 to 0.75 rotation (average of 0.5 rotation) and an arc height of 8 to 20 mm (average of 12 mm and 17 mm).

Cord 2B of type 2 was also found to exhibit a rigidity index G2 in the direction of the short diameter of 94 and 97, a rigidity index Gi in the direction of the long diameter of 111 and 109, and a rigidity ratio G1/G2 of 1.18 and 1.12. As described previously, the rigidity index represents a ratio in the case where the rigidity G3 of a round wire is used as a reference value of 100. The rigidity index was measured in two directions shown in FIG. 17. The cord 2B of type 2 was found to exhibit a large value of elongation at break, i.e., 3.0 to 5.0%.

Then, the cut cords 2B were subjected to a so-called calendering step in which the cut cords 2B were arranged in parallel at a predetermined pitch on a crude rubber sheet (step S29). In the calendering step S29, the cords 2B were arranged such that one flat surface of the cord 2B was parallel to the surface of the crude rubber sheet. Since the cut cords 2B had a small arc height, it was possible to arrange easily the cut cords 2B. The cut cords 2B were arranged at a pitch of, for example, 1.2 mm.

Then, the rubber sheet was cut in a predetermined size (step S30). Two cut sheets 12B and 14B were superposed one upon the other on a belt portion of the tire-shaped rubber article to allow the buried cords 2B to cross each other at a predetermined angle. Further, a rubber member 16 having a tread 18 was attached to the rubber sheet 14B on the outside (second layer), thereby burying the cords 2B completely within the rubber (step S31). The article thus assembled was heated to a predetermined temperature to make the article integral and, thus, to obtain a tire product 10B shown in FIG. 14C (step S32).

The flattening ratio D2 (short diameter of the flattened wire)/W2 (long diameter of the flattened wire) of the cord of type 2 was set at 0.80 to 0.95. If the flattening ratio D2/W2 exceeds 0.95 to make the cross section of the cord close to a circular cross section, it is impossible to obtain a sufficient effect of decreasing the kill (rotary torque). It is also impossible to obtain a sufficient difference in rigidity between the direction of the long diameter and the direction of the short diameter.

On the other hand, the lower limit of the flattening ratio D2/W2 of the cord of type 2, which is 0.80, is set higher than that of the flattening ratio D1/W1 of the cord of type 1, which is 0.50. It should be noted that each of the forming treatment and the flattening treatment is applied twice after the drawing step in the manufacture of the cord of type 2. Thus, in order to suppress the damage done to the tire, it is necessary to set the lower limit of the flattening ratio D2/W2 at a high value.

The forming height F2 in the direction of the long diameter of the cord of type 2 was set at 0.05 to 0.5 mm. If the forming height F2 is set larger than 0.5 mm, the elongation is rendered excessive. Also, in the calendering step, the ridge and valley of the adjacent cords are positioned to face each other to make the clearance between the cords nonuniform.

In the cord of type 2, the maximum value of the forming height F3 in the direction of the short diameter was set at 0.3 mm. If the forming height F3 is unduly large, the rubber layer of the tire is rendered thick, which is contradictory to the object of decreasing the tire weight. Also, the minimum value of the forming height F3 is set at 0.05 mm. If the forming height F3 is smaller than 0.05 mm, it is impossible to suppress the allowable value of the arc height at 30 mm or less.

The cord 2B of type 2 was found to exhibit an arc height (linearity) of 12 mm and 17 mm and a kill (rotary torque) of 0.5 rotation, supporting that cord 2B was excellent in quality.

Further, tire 10B having the cord of type 2 buried therein was found to be satisfactory like the tire having the cord of type 1 buried therein in terms of the durability derived from the high lateral rigidity and the comfortableness of riding derived from the low vertical rigidity.

Single wire steel cords according to Comparative Examples 1 to 3 will now be described with reference to FIGS. 15A, 15B, 16A and 16B.

Comparative Example 1
Round Wire Two Dimensional Crimp Formed Cord

A round wire two dimensional crimp formed cord having a cross section as shown in FIGS. 15A and 15B was prepared as a single wire steel cord 2C of Comparative Example 1 by using a filament equal to that used in the Examples of the present invention. As shown in Table 1, the cord 2C of Comparative Example 1 was found to have a diameter D of 0.40 mm and a forming pitch P of 6 mm. The cord 2C was also found to have a rigidity index G2 of 100 in the direction of the short diameter, a rigidity index G1 of 103 in the direction of the long diameter, and a rigidity ratio G1/G2 of 1.03. Further, the cord 2C was found to have an arc height (linearity) of 39 mm and a kill (rotary torque) of 1.0 rotation.

Comparative Example 2
Round Wire Three Dimensional Spiral Formed Cord

A round wire three dimensional spiral formed cord having a cross section as shown in FIGS. 16A and 16B was prepared as a single wire steel cord 2D of Comparative Example 2 by using a filament equal to that used in the Examples of the present invention. As shown in Table 1, the cord 2D of Comparative Example 2 was found to have a diameter D of 0.40 mm and a spiral pitch P of 6 mm. The cord 2D was also found to have a rigidity index G2 of 100 in the direction of the short diameter, a rigidity index G1 of 100 in the direction of the long diameter, and a rigidity ratio G1/G2 of 1.00. Further, the cord 2D was found to have an arc height (linearity) of 18 mm and a kill (rotary torque) of 0.5 rotation.

Comparative Example 3
Round Wire Cord

Figure 17:
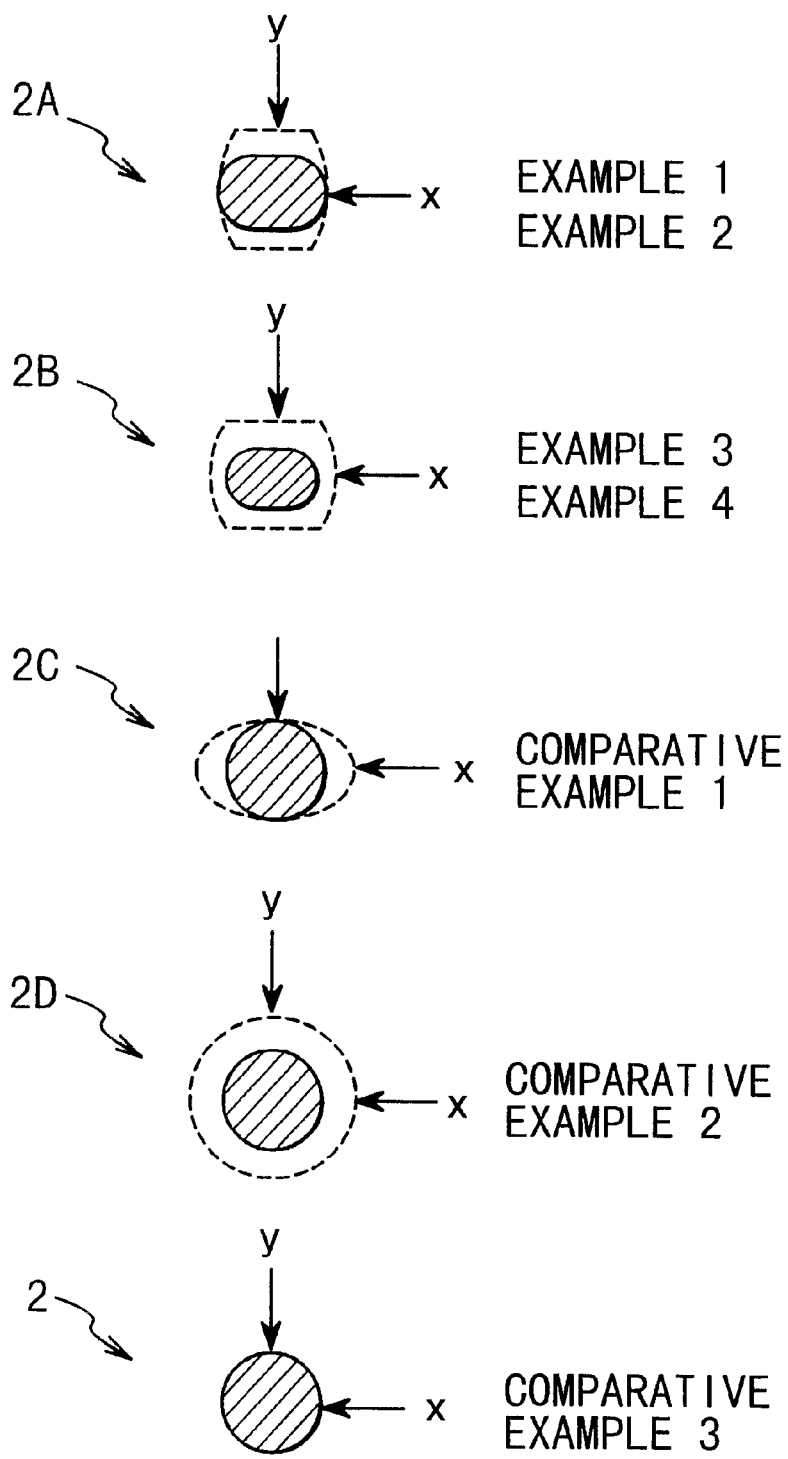
FIG. 17 shows cross sections of single wire steel cords according to Examples of the present invention and Comparative Examples for explaining the rigidity of the cord.

A round wire cord having a cross section as shown in FIG. 17 was prepared as a single wire steel cord 2 of Comparative Example 3 by using a filament equal to that used in the Examples of the present invention. As shown in Table 1, the round wire cord 2 of Comparative Example 3 was found to have a diameter D of 0.40 mm, a rigidity index G2 of 100 in the direction of the short diameter, a rigidity index G1 of 100 in the direction of the long diameter, and a rigidity ratio G1/G2 of 1.00. Further, the cord 2 was found to have an arc height (linearity) of 45 mm and a kill (rotary torque) of 2.5 rotations.

Cords of each of types 1 and 2 were prepared for examining the characteristics of these cords. As a result, effects [I] to [V] given below were confirmed.

[I] Effect of Decreasing Kill (Rotary Torque Inherent in Tire) Produced by Flattening Treatment:

(a) The kill is an important performance for guaranteeing the quality of the steel cord. Where a single wire steel cord is manufactured directly by a wire drawing machine, it is particularly important to control the kill in the drawing machine. In general, a round wire after the drawing step exhibits a kill of about 1 to 5 rotations.

The present inventors have found that the kill can be lowered to a value substantially equal to zero rotation by flattening the round wire. Since a single wire steel cord having a kill of a low level, i.e., 0 to 1 rotation, can be manufactured stably by subjecting a wire to a driving roll rolling, it is possible to change the whole check of the kill employed in the past to a spot check (period supervision). As a result, the frequency of the check is markedly lowered so as to reduce markedly the checking work. At the same time, it is possible to manufacture cords having further stabilized kill.

(b) A flattened wire exhibits an anisotropy of rigidity that the rigidity G1 in the direction of the long diameter is higher than the rigidity G2 in the direction of the short diameter. The relationship given by formula (1) has been found among the rigidity G1 of the flattened wire in the direction of the long diameter, the rigidity G2 of the flattened wire in the direction of the short diameter, and the rigidity G3 of the conventional round wire:

$$G1 > G3 > G2 \quad (1)$$

Since the steel cord is arranged in the belt layer of the tire such that the flattened surface of the cord faces that portion of the tire which is in direct contact with the ground, the rigidity E1 in the lateral direction of the tire is rendered greater, compared with the conventional round wire, leading to an improved cornering power. Also, the rigidity E2 in the vertical direction of the tire is diminished so as to increase the flexibility of the entire tire and, thus, to improve the comfortableness of riding.

[II] Effect of Decreasing the Arc Height (Linearity of Wire) Produced by Forming Treatment:

(a) The flattened wire that is not subjected to a forming treatment has a large arc height and, thus, is not suitable for use as a cord. However, the arc height is markedly improved by applying a forming treatment to the flattened wire in the direction of the short diameter of the cross section of the wire, making it possible to lower the arc height to fall within a controllable range (≦30 mm) of the general-purpose cord.

(b) The elongation required for the cord can be ensured by applying two types of forming treatment to the flattened wire.

Specifically, a forming treatment is applied in the direction of the short diameter to cord 2A of type 1 to obtain a low elongation at break of 2.5 to 3.5%. On the other hand, forming treatments are applied in the directions of the long diameter and the short diameter to cord 2B of type 2 to obtain a high elongation at break of 3.0 to 5.0%.

[III] Thinning of Rubber Layer:

The flattened single wire steel cord that is subjected to a forming treatment is arranged such that the flattened surface of the cord faces that portion of the tire which is in direct contact with the ground.

The particular arrangement is effective for decreasing the tire weight, compared with the conventional single wire steel cord made of a round wire or the (1×n) stranded steel cord.

[IV] Cost Reduction:

In the present invention, a stranding machine is not used at all. In addition, a driving roll rolling machine and a crimping machine are arranged downstream of a wire drawing machine for applying a flattening treatment and a forming treatment continuously to a drawn wire so as to manufacture a single wire steel cord. The omission of the stranding machine leads to a marked cost reduction. In addition, the omission permits the working rate of the wire drawing machine to be about 3 times as high as that in the case of using the conventional stranding machine. It follows that the present invention makes it possible to achieve a prominent reduction in the manufacturing cost of the steel cord.

[V] Evaluation of Fatigue Resistance:

The fatigue resistance of each single wire steel cord was evaluated by using a belt durability tester 60 shown in FIG. 20. As shown in FIGS. 18 and 19, a test piece 90 comprises a sample layer, in which 5 single wire steel cords 2 (2A, 2B, 2C or 2D) are equidistantly arranged to form a row on the lower region of a rubber member 91, and a backbone layer, in which 5 stranded cords 93 of (2+2×0.25) stranded structure are equidistantly arranged to form a row on the upper region of the rubber member 91. Incidentally, the test piece 90 was sized at 6 mm in thickness T, 12 mm in width W, and 400 mm in length L.

The belt durability tester 60 includes a roller 61 having a diameter of 20 mm. The test piece 90 was wound about the roller 61 such that the sample layer was in direct contact with the outer surface of the roller 61. Further, a weight 62 was attached to each end of the test piece 90 to apply a load of 60 kgf to the test piece 90. Under this condition, the test piece 90 was pulled up and down with a stroke of 50 mm. The moving direction of the test piece 90 was switched at a frequency of 60 cycles per minute, and the moving direction was changed 2,000 times.

After the test, the sample layer of the test piece 90 was irradiated with a soft X-ray to obtain an x-ray transmission photograph. The x-ray transmission photograph was observed to count the number of broken regions (NBR) of the cord (wire) for each sample. Five test pieces were included in a single lot, and the average value was used for the evaluation. Each of the arc-shape forming cord and the gear crimp forming cord was found to exhibit a satisfactory fatigue resistance. Incidentally, the arc-shape forming cord was found to be somewhat superior to the gear crimp forming cord in the fatigue resistance.

TABLE 1

| Sample No. | Manufacturing method | Wire diameter | | Flattening ratio D/W |
| --- | --- | --- | --- | --- |
| | | D short diameter (mm) | W long diameter (mm) | |
| 1 Example 1 | type 1 | 0.03 | 0.46 | 0.65 |
| 2 Example 2 | type 1 | 0.36 | 0.44 | 0.82 |
| 3 Example 3 | type 2 | 0.36 | 0.44 | 0.82 |
| 4 Example 4 | type 2 | 0.38 | 0.43 | 0.88 |
| 5 Comparative Example 1 | round wire two dimensional crimp | 0.40 | 0.40 | 1 |
| 6 Comparative Example 2 | round wire three dimensional spiral | 0.40 | 0.40 | 1 |
| 7 Comparative Example 3 | round wire | 0.40 | 0.40 | 1 |

| Sample No. | Rigidity | | Rigidity ratio G1/G2 | Kill | Arc Height (mm) |
| --- | --- | --- | --- | --- | --- |
| | G1 long diameter direction | G2 short diameter direction | | | |
| 1 Example 1 | 149 | 74 | 2.00 | 0.5 | 15 |
| 2 Example 2 | 114 | 97 | 1.18 | 0.5 | 24 |
| 3 Example 3 | 111 | 94 | 1.18 | 0.5 | 12 |
| 4 Example 4 | 109 | 97 | 1.12 | 0.5 | 17 |
| 5 Comparative Example 1 | 103 | 100 | 1.03 | 1.0 | 39 |
| 6 Comparative Example 2 | 100 | 100 | 1.00 | 0.5 | 18 |
| 7 Comparative Example 3 | 100 | 100 | 1.00 | 2.5 | 45 |

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A vehicle tire comprising a single wire steel cord prepared by flattening a round wire to have two flat surfaces and two round surfaces interposed between the two flat surfaces, the single wire steel cord being embedded in a tire belt portion such that one of the flat surfaces faces that portion of the tire which is brought into contact with the ground, wherein a flattening ration D/W of the wire, where D denotes the short diameter of the cross section of the flattened wire and W denotes the long diameter of the cross section of the flattened wire, falls within a range of 0.5 to 0.95, and forming is applied in a direction of at least the short diameter.

2. A vehicle tire according to claim 1, wherein said forming of the single wire steel cord is a crimp forming in the direction of the short diameter alone.

3. A vehicle tire according to claim 2, wherein the forming height of said crimp forming of the single wire steel cord is 0.05 to 0.3 mm.

4. A vehicle tire according to claim 1, wherein said forming of the single wire steel cord is a crimp forming applied in the direction of the short diameter and in the direction of the long diameter.

5. A vehicle tire according to claim 4, wherein said crimp forming of the single wire steel cord is performed in a forming height in the direction of the short diameter of 0.05 to 0.3 mm and in a forming height in the direction of the long diameter of 0.05 to 0.5 mm.

6. A vehicle tire according to claim 4, wherein the flattening ration D/W of the single wire steel cord is set at 0.80 to 0.95.

7. A vehicle tire according to claim 1, wherein said forming of the single wire steel cord is applied at a pitch of 2 to 20 mm.

8. A vehicle tire according to claim 1, wherein said forming of the single wire steel cord constitutes a smooth continuous curve selected from the group consisting of arcs, sine waves, continuous arcs of cycloid (spiral curve), continuous arcs of cardioid (heart-shaped curve), and continuous arcs of tractrix (suspended line-shaped curve).

9. A vehicle tire according to claim 1, wherein said forming of the single wire steel cord is a pin roller processing consisting of only smoothly continuous curved portions that do not include straight portions within a single plane.

10. A vehicle tire according to claim 8, wherein said forming of the single wire steel cord is performed by a pin roller processing in the direction of the short diameter alone.

11. A vehicle tire according to claim 9, wherein the forming height in said pin roller processing of the single wire steel cord is set at 0.05 to 0.3 mm.

12. A vehicle tire according to claim 9, wherein said forming of the single wire steel cord by a pin roller processing in the directions of both the long diameter and the short diameter.

13. A vehicle tire according to claim 12, wherein the forming height of the single wire steel cord in the direction of the short diameter is set at 0.05 to 0.3 mm and the forming height of the single wire steel cord in the direction of the long diameter is set at 0.05 to 0.5 mm in said pin roller processing.

14. A vehicle tire according to claim 12, wherein a flattening ratio D/W of the single wire steel cord is set at 0.80 to 0.95.

15. A vehicle tire according to claim 1, wherein said round wire has a tensile strength of 280 to 400 kgf/mm$^2$.

16. A vehicle tire according to claim 1, wherein said round wire contains 0.70 to 1.00% by weight of carbon.

* * * * *

UNITED STATES PATENT AND TRADEMARK OFFICE
CERTIFICATE OF CORRECTION

PATENT NO. : 6,273,161 B1
DATED : August 14, 2001
INVENTOR(S) : A. Yamagami et al.

It is certified that error appears in the above-identified patent and that said Letters Patent is hereby corrected as shown below:

Column 15,
Lines 1 and 23, "ration" should read -- ratio --

Column 16,
Line 7, "claim 8," should read -- claim 9, --
Line 14, "after "steel cord" insert -- is performed --

Signed and Sealed this

Second Day of July, 2002

Attest:

Attesting Officer

JAMES E. ROGAN
Director of the United States Patent and Trademark Office